Sept. 28, 1937.　　　　M. LUCKIESH　　　　2,094,158

REFLECTION FACTOR GAUGE

Filed Feb. 21, 1936

INVENTOR:
MATTHEW LUCKIESH
BY Kwis Hudson & Kent
ATTORNEYS

Patented Sept. 28, 1937

2,094,158

UNITED STATES PATENT OFFICE 2,094,158

REFLECTION FACTOR GAUGE

Matthew Luckiesh, Shaker Heights, Ohio

Application February 21, 1936, Serial No. 65,168

3 Claims. (Cl. 88—14)

This invention relates to a reflection factor gauge for determining the reflection factor of any surface from which light is reflected.

The principal object of the invention is to provide a gauge for the purpose stated by which the reflection factor of a surface may be obtained easily and quickly.

A further object is to provide a gauge or reflectometer which is simple and inexpensive and which employs the phenomenon of induction utilized in a manner such that the color factor and the difficulties heretofore experienced by reason of color differences are practically eliminated.

The invention may be briefly summarized as consisting in the reflection factor gauge as hereinafter described by which the reflection factor is determined through the new use of the principle of induction.

In the accompanying sheet of drawings, wherein I have shown the preferred embodiment of the invention and a slight modification, Fig. 1 is a plan view of my improved reflection factor gauge;

Figure 1:
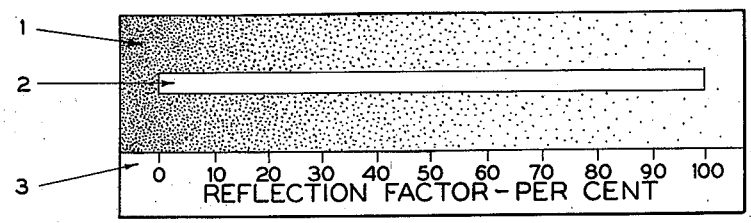
Figure 2:
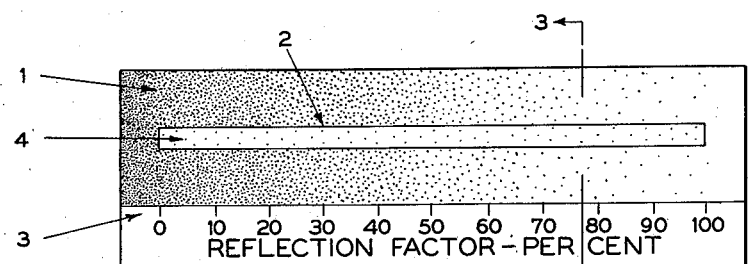
Fig. 2 is a similar view showing the use of a filter for a purpose to be explained.
Figure 3:
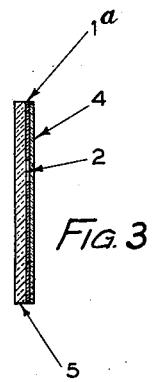
Fig. 3 is a transverse sectional view along the line 3—3 of Fig. 2.

The reflectometers which have been used heretofore compared with the device which constitutes the subject matter of the present invention are complicated and require considerable skill and judgment on the part of the user, and the determination of a reflection factor is time-consuming. These objections are overcome by my improved reflection factor gauge and by what I believe to be an entirely new method of determining the reflection factor of a surface in a very simple manner by utilizing the principle of induction which, so far as I am aware, is a new application of this principle.

In the attainment of these results by the induction principle, I utilize a brightness gradient formed on a suitable surface wherein the brightness varies gradually and uniformly from one extreme to another, i. e., from no brightness or practically no brightness to high brightness at or approaching complete whiteness. In this gradient I provide a continuous slot and preferably also a properly calibrated scale alongside and coextensive with the slot. To obtain the reflection-factor with a gradient equipped with a slot and a scale, as stated above, it is only necessary to place the same on the surface whose reflection factor is to be obtained. Toward one end of the gradient the surface viewed through this slot will appear brighter than it actually is, by the principle of induction, due to the darker surrounding area of the gradient. Toward the other end of the slot and gradient, the reverse will be true for here the surface viewed through the slot will appear to be darker than it actually is, again by the principle of induction, occasioned by the relatively light or bright surrounding surface of the gradient. Therefore, there is, lengthwise of the slot, a point representing the transition from the greater apparent brightness to the lesser apparent brightness since at this point there is no induction effect on the surface viewed because at this point the surface is not affected by the adjacent portion of the gradient since it is of the same degree of brightness as the immediately adjacent part of the gradient. Accordingly, this point of transition is the reflection factor of the surface, which can be readily read or determined in degrees or percentage on the adjoining scale.

The gradient may be produced on any suitable white or nearly white surface, such, for example, as upon ordinary photographic paper by so exposing the sensitized surface as to produce a gradient having a gradually varying degree of brightness varying from a predetermined degree of "darkness" to a predetermined degree of "lightness". Generally the gradient will be black or nearly black at one end and white or nearly white at the other end, with a gradual or uniform gradation of brightness from one extreme to the other. However, the gradient may have any desired given range between these two extremes. Likewise, it may be produced by other methods than by the exposure of a sensitized paper.

In the drawing, the gradient is represented by the reference character 1 and the surface or medium on which it is formed by the reference character 1ª. Assuming that the medium on which the gradient is formed is thin and flexible, such as paper, it is desirably stiffened so it will lie flat on the surface whose reflection factor is to be determined. This can be accomplished in different ways, but in this instance the paper or other medium 1ª having the gradient 1 is adhered by cementing or otherwise to a transparent body, such as a flat piece of transparent glass or celluloid 5 which in this instance overlies the gradient. In the gradient, i. e., in the surface on which the gradient is formed, there is cut a relatively narrow slot 2 which is preferably coextensive with the length of the gradient or substantially so. This slot extends substantially centrally through the gradient, i. e., so that a portion of the gradient will lie on each side of the slot. Alongside and extending lengthwise of the gradient, preferably coextensive with the slot, is a suitably calibrated scale 3 on which the reflection factor can be read. This completes the gauge itself for the determination of the reflection factor of most surfaces which are encountered in practice.

However, where it is desired that the reflection factor gauge have a very wide range up to reflection factors of substantially 100%, I find it desirable to cover the slot 2 of the gradient with a light gray transparent filter 4 which lowers the apparent brightness of the surface to be measured when the surface is viewed through the filter, the effect of lowering the brightness of the surface being equivalent to increasing the range of the instrument, particularly at the light or bright end of the gradient. This is desirable where the reflection factor of practically white surfaces is to be determined. By the use of a filter of this kind, which gives an apparent brightness of the surface to be measured somewhat lower than its actual brightness, there is offset any limitation of range due to the fact that at its bright end the surface of the gradient may not have 100% brightness or due to reduced brightness caused by the optical contact between the glass stiffening strip and the surface or medium bearing the gradient. In this instance, the filter is applied by cementing or otherwise attaching to the lower side of the surface 1a bearing the gradient a thin strip of celluloid which is so selected as to have the right filtering effect. However, if desired, instead of employing a glass strip 5 overlying the gradient and a filtering strip underlying the same, the filter and the stiffening strip may be combined in one element, as by applying to the lower side of the medium bearing the gradient a transparent strip, such as celluloid, having the right amount of stiffness and at the same time the desired filtering effect.

It will be understood, of course, that when a filter such as described is employed, the difference between the actual brightness of the surface being measured and its apparent brightness when viewed through the filter will be compensated for on the scale so that the position of the transition point between the induced brightness and the induced darkness, when read on the scale, will give the true and not the apparent reflection factor.

Figure 4:
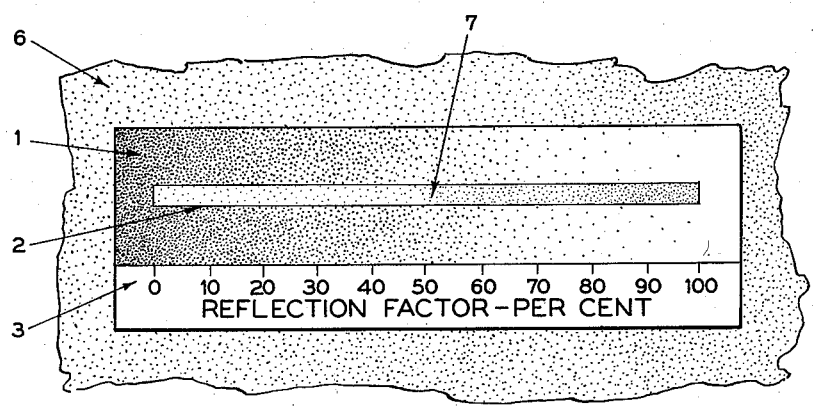
Fig. 4 is a view similar to Fig. 1 showing the manner in which the gauge is used and the method by which the reflection factor of a surface is determined.

In using my improved gauge, the latter is simply placed upon or laid flat on the surface to be measured, as indicated in Fig. 4, wherein the surface whose reflection factor is to be determined is designated 6. In this figure, the gauge is shown placed upon the surface 6 so that a portion of the latter is seen through the slot 2. In this same figure I have indicated by the light and the dark shading respectively the induced brightness in one portion of the slot and the induced darkness in the other, and have shown and indicated at 7 the transition point. The operator or user permits his eyes to rove quickly along the entire length of the slot up and down the gradient. Very quickly and easily he finds the transition point which, on the adjacent scale, gives the reflection factor of the surface. In determining the reflection factor by this method, the color of the surface is not a factor and there is eliminated the annoyance of color differences which heretofore have added to the difficulty of obtaining the reflection factor by other methods of determination. It is to be noted that in determining the reflection factor by my method the operator observes no part of the surface 6 except that which is seen through the slot, and, contrary to the methods heretofore employed, he is not required to arrive at the reflection factor by a method involving a comparison of the brightness of the surface 6 with a series of surfaces having different degrees of brightness and is therefore relieved of the obligation of matching one surface with another and to arrive at a solution of the problem by the process of elimination. This in itself is a decided factor in the quickness and facility with which the reflection factor of a surface can be determined.

It might be mentioned in conclusion that, while I have shown one way of constructing my improved reflection factor gauge, I do not wish to be confined to the details herein disclosed. For example, I do not regard it essential to the invention that the surface carrying the gradient be attached to the lower side of a glass plate, as other ways of stiffening and keeping the surface flat may be utilized in the event the surface is not inherently rigid. The above presumes a gauge adapted for determining the reflection factors of flat surfaces. However, in some instances it may be desirable to determine the reflection factor of a surface other than flat, in which event it may be desirable that the gauge be flexible so that it can be made to conform to the curved or otherwise non-flat surface. Furthermore, it is not essential to the invention that the gradient and the slot be straight or linear. For example, the gradient and slot may be circular or arc-shaped. Finally, it might be stated that it is not essential that the slot have parallel edges, although that is preferred. The sides of the slot may be other than straight, it being essential only that the slot be continuous and narrow enough to give the induction phenomenon which forms the basis of my method.

I therefore aim in my claims to cover all changes and modifications which do not involve a departure from the spirit and scope of the invention in its broader aspects.

Having thus described my invention, I claim:

1. A reflection factor gauge composed of a surface having a gradient of uniformly varying brightness from one end to the other and provided with a narrow elongated slot which is bounded on both sides by the gradient and through which a surface beneath the gauge may be viewed, the relation between the width of the slot and the width of the gradient being such that when the surface is viewed through the slot the induction phenomenon is observed substantially as described.

2. A reflection factor gauge comprising a surface having a gradient of uniformly varying brightness from one end thereof to the other with a slot extending through and along the gradient so that portions of the gradient are on both sides thereof, the relation between the width of the slot and the width of the gradient being such that when a surface is viewed through the slot the induction phenomenon is observed substantially as described, and an adjoining scale on which may be read the reflection factor determined by the phenomenon of induction.

3. A reflection factor gauge comprising a surface having a gradient of uniformly varying brightness with a slot extending therethrough lengthwise thereof so that portions of the gradient are on both sides thereof, and a transparent filter bridging the slot, the relation between the width of the slot and the width of the gradient being such that when a surface is viewed through the slot the induction phenomenon is observed substantially as described.

MATTHEW LUCKIESH.